United States Patent [19]
Adams et al.

[11] Patent Number: 5,816,637
[45] Date of Patent: Oct. 6, 1998

[54] TRUCK CARGO SPACE EXTENSION BED

[76] Inventors: Litz Adams, 1013 Folger Dr., Statesville, N.C. 28677; Wayne D. Ketner, 101 Shadylawn Dr., Winston-Salem, N.C. 27104

[21] Appl. No.: 770,523
[22] Filed: Dec. 20, 1996
[51] Int. Cl.[6] ................................................. B62D 33/08
[52] U.S. Cl. ........................................ 296/26.09; 296/57.1
[58] Field of Search ............................. 296/26, 50, 57.1, 296/26.09

[56] References Cited

U.S. PATENT DOCUMENTS 5,456,511  10/1995  Webber .................................. 296/26

Primary Examiner—Andrew C. Pike
Attorney, Agent, or Firm—John M. Harrington; Kilpatrick Stockton LLP

[57] ABSTRACT

An extension bed for extending the cargo space of a truck of the type having a truck bed including a floor, side walls, and a tailgate is readily installed in any standard-sized pickup truck and is easily slidable from its retracted, storage position within the truck bed to an extended position supported by the open tailgate of the truck. The truck cargo space extension bed includes an extension floor, an extension tailgate, and opposing upright extension side walls having a substantially t-shaped channel extending the length of the side walls and corresponding t-shaped pins mounted to the pickup truck for slidably connecting the extension bed to the pickup truck side walls. The t-shaped channels include a stop mechanism for preventing the extension bed from becoming accidently disengaged from the pickup truck and a latch on the extension bed for selectively locking the extension bed in the extended position. The extension tailgate is rotatable between a closed, upright position and an open horizontal position and includes a support mechanism for supporting the extension tailgate in the open position.

15 Claims, 3 Drawing Sheets

TRUCK CARGO SPACE EXTENSION BED

BACKGROUND OF INVENTION

1. Field of Invention

The subject invention is generally related to extension apparatuses for use in a motor vehicle and is specifically directed to a truck cargo space extension bed for extending the cargo space of a pickup truck.

2. Description of the Prior Art

Pickup trucks are well known and provide a convenient way for individuals to transport a large variety of items in their own vehicle. A truck bed is typically defined by the back portion of the truck cab, the truck side walls, and a tailgate which may be lowered to an open position from the closed, raised position. A standard truck bed provides a 6-foot long cargo space with the tailgate in the closed, raised position. While the cargo space may be increased by lowering the tailgate, ideally, the tailgate remains closed to secure items being transported in the truck bed. However, it is often necessary to lower the tailgate to provide additional cargo space within the truck bed. In this situation, the items being transported may become damaged through the open tailgate or fall off the truck since they are not secured within an enclosed truck bed. While large trucks with larger truck beds are available, it usually is not practical or desirable for an individual to drive a larger truck in order to gain the benefits of an increased cargo space.

Various extension apparatuses for increasing the cargo space of a truck are known. Examples of one type of such extenders are shown in U.S. Pat. No. 2,852,303 issued to Hopson on Sep. 16, 1958 and in U.S. Pat. No. 5,456,511 issued to Webber on Oct. 10, 1995. The Hopson patent discloses a truck body extension including a series of tracks with channel-shaped rails mounted on the under surface of the bottom of the extension and including spaced trucks with four rotatable wheels mounted on each side of the channel. The Hopson patent requires that a separate set of channel-shaped tracks and transversely disposed bars be mounted on the floor of the truck body and positioned in registering relation with the channel-shaped rails mounted on the extension.

The Webber patent discloses a truck bed extender including a pair of horizontal rails each having a J-shaped cross section defining a raceway and being mounted to the opposite side walls of a truck bed. The Webber extender includes an extender pan, a plurality of side rollers attached to the sides of the pan which are received in the raceway, and a plurality of bottom rollers attached to the bottom of the pan which roll along the truck bed floor. In order to secure the extender in place, Webber includes a pair of locking, threaded adjustment knobs which fit in a guiding slot and may be tightened to lock the pan in place or loosened to allow the pan to move back and forth. One disadvantage of the type of extender shown in Hopson and Webber is that the truck bed must be substantially modified to include a frame device along the side walls and/or a rail apparatus along the floor board before the extension apparatus and its roller system may be mounted in the truck bed and utilized. Another disadvantage is that such an extended includes a multitude of parts and rotatable rollers which must be kept in good working condition. Also, with a large number of parts and moveable rollers, there is an increased risk of a part breaking or not working properly so that the extension bed may not be readily utilized.

An example of another type of truck bed extender is shown in U.S. Pat. No. 4,472,639 issued to Bianchi on Sep. 18, 1984. The Bianchi patent discloses a foldable extension apparatus which utilizes the surface of the truck tailgate and several hinged panels to form an extension. The Bianchi extension includes a pivotable back panel and a pair of pivotable side panels which may be folded into a collapsed storage position and assembled into an upright, in-use position for extending the cargo space of a truck.

While the Bianchi extension increases the cargo space, one disadvantage is that it must be assembled in several steps from the collapsed storage position each time it is used. Another disadvantage is that the collapsible back panel and side wall panels do not have the strength of a rigid extension bed with integral upright side walls.

Therefore, there is a need for an improved extension bed for extending the cargo space of a truck which is readily installed, easily moveable between a retracted storage position and extended position, and does not include a multitude of moving parts or require substantial modification of the existing truck bed.

SUMMARY OF THE INVENTION

The subject invention is directed to an improved extension bed for extending the cargo space of a truck, such as a pickup truck of the type having a truck bed, a floor board, side walls, and a tailgate. The improved truck cargo space extension bed of the subject invention is specifically designed to be easily installed in any standard-sized pickup truck, and is readily accessible and easily slidable from its retracted, storage position within the truck bed to an extended position supported by the open tailgate of the truck. In use, the tailgate of the truck is opened and the improved extension bed is moved to the extended position and may extend, for example, a standard six-foot long cargo space of a pickup truck to eight feet.

The improved truck cargo space extension bed of the subject invention includes an extension floor and opposing upright extension side walls attached to the floor which each include a uniquely configured, substantially t-shaped channel for slidably connecting the extension side walls of the subject invention to the opposing interior side walls of the truck bed. The substantially t-shaped channels are adapted to receive a pin which is securely fastened to the truck side walls. The pins include an enlarged head and neck dimensioned to be received into and held by the t-shaped channels and are slidable therethrough. The improved extension bed is connected to the truck side walls by mounting the extension side walls onto the pins so that the extension bed is slidable along the length of the t-shaped channels and is easily moved from a retracted, storage position within the truck bed to an extended, in-use position supported by the open tailgate of the truck.

In the preferred embodiment, each substantially t-shaped channel is horizontally disposed and has a closed end at the front end of the extension side wall and an open end at the back end of the extension side wall. When installing the extension bed, the pins are inserted into each t-shaped channel at the open end of the channel and the extension bed may be manually moved back and forth so that the pin slides through the length of the channel. When the bed is fully extended, the closed end of the channel provides a stop for preventing the pin from sliding through and exiting the channel at the front end of the extension side wall. Thus, the improved extension bed is designed to prevent the bed from extending too far and becoming accidently disengaged from the truck bed while in use and falling off the open tailgate of the truck. However, while the stop prevents the pin from exiting the front end of the side wall, it does not prevent the extension bed from retracting back into the truck bed from the extended position while in use. Thus, the improved extension bed includes a latch for locking the extension bed to the truck cargo space tailgate so that it remains in the extended position while in use.

In the preferred embodiment, the improved truck cargo space extension bed includes an extension tailgate which may remain closed to secure items being transported or may be lowered to provide additional cargo space. The extension tailgate is rotatably attached to the extension floor and is easily moveable between a closed, upright position against the extension side walls and an open, horizontal position level with the extension floor. The improved truck cargo space extension bed of the subject invention also includes a support mechanism for supporting the extension tailgate in the open, horizontal position. In the preferred embodiment, the support mechanism includes a pair of flexible members constructed of a strong material, such as metal chains by way of example, attached to either side of the tailgate at one end and to the upper portion of the back end of the extension side walls at the other end. When the extension gate is opened, the flexible members are extended to their maximum length and support the extension tailgate in the open position. When the extension gate is closed, the flexible members are folded into a collapsed, storage position within the extension bed. In addition, the subject invention may include an upper extension ledge on the extension side walls of the extension bed. The extension ledge is omitted when the improved extension bed is for use with a truck which has a camper body, side rails, or the like mounted on top of the truck cargo space side walls.

Therefore, it is an object and feature of the subject invention to provide an improved truck cargo space extension bed which is easily installed in any pickup truck, readily accessible for use, and easily slidable from its retracted, storage position to its extended position.

It is a further object and feature of the subject invention to provide an improved truck cargo space extension bed including extension side walls having substantially t-shaped channels and corresponding pins mounted to the pickup truck for slidably connecting the extension bed to the pickup truck side walls.

It is another object and feature of the subject invention to provide an improved truck cargo space extension bed including t-shaped channels having a stop at one end for preventing the extension bed from becoming accidently disengaged from the pickup truck and a latch on the extension bed for selectively locking the extension bed in the extended position.

It is yet another object and feature of the subject invention to provide an improved truck cargo space extension bed including an extension tailgate which may remain closed to secure items being transported or may be lowered to provide additional cargo space. It is yet another object and feature of the subject invention to provide an improved truck cargo space extension bed which includes a support mechanism for supporting the extension tailgate in the open position yet is foldable to a collapsed, storage position when the extension tailgate is in the closed position.

Other objects and features will be readily apparent from the accompanying drawings and description.

DETAILED DESCRIPTION OF THE DRAWINGS

Figure 1:
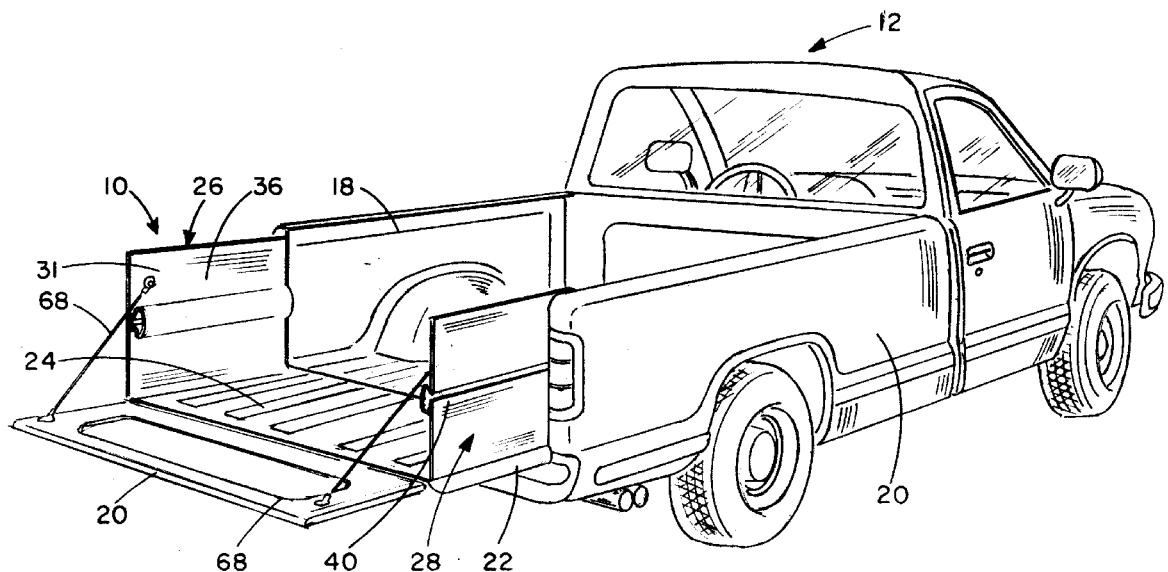
FIG. 1 is a perspective view of a pickup truck including the extension bed of the subject invention and showing the extension bed in the fully extended position for extending the cargo space of the pickup truck.
Figure 2:
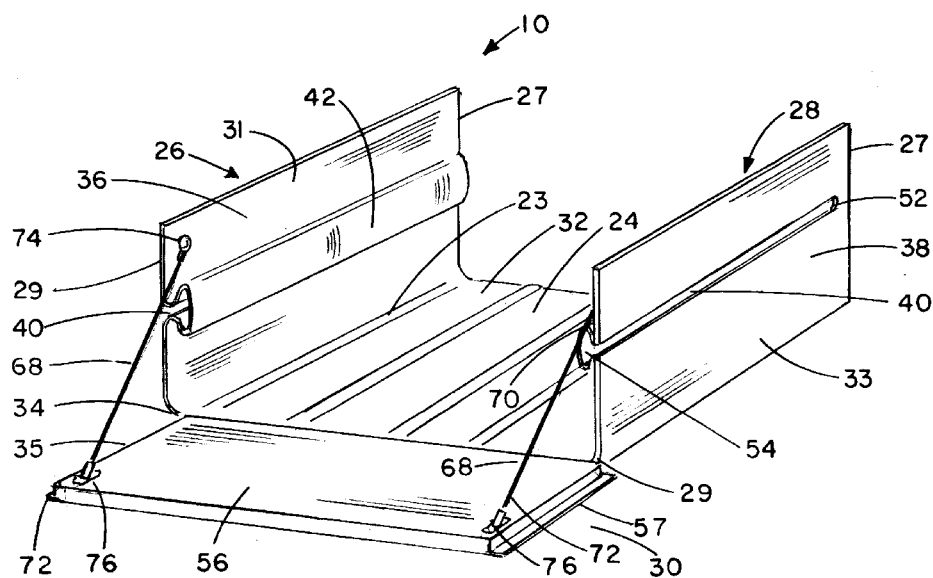
FIG. 2 is a perspective view of the truck cargo space extension bed with the extension tailgate in the open position and showing the t-shaped channels extending through each extension side wall and the extension tailgate support mechanism.

The subject invention is shown in FIGS. 1–6 and is specifically directed to an improved truck cargo space extension bed 10 for extending the cargo space of a truck, such as pickup truck 12 having a truck bed 14, a floor board 16, truck side walls 18, 20, and a tailgate 22. The subject invention is easily installed in a pickup truck 12 and is readily utilized from its retracted, storage position within the truck bed 14 to its extended position supported by the open tailgate 22 of the truck 12. As shown in FIG. 2, the improved truck cargo space extension bed 10 comprises an extension floor 24, two opposing, upright side walls 26, 28, and an extension tailgate 30. The extension floor 24 has opposite sides 23, 25, a forward end 32, and a rear end 34. The upright extension side walls 26, 28 are attached to the opposite sides 23, 25 of the floor. Each of the extension side walls 26, 28 have a front end 27, a back end 29, and an upper portion 31 and lower portion 33. The lower portion 33 of the walls 26, 28 are attached to the floor 24 such that the front end 27 of each wall is adjacent to the forward end 32 of the floor 24 and the back end 29 of each wall is adjacent to the rear end 34 of the floor 24. Each of the extension side walls 26, 28 also has an interior surface 36 which faces inward toward the cargo space of the extension bed 10 and an exterior surface 38 which faces outward toward the interior of the opposing truck side walls 18, 20.

Figure 3:
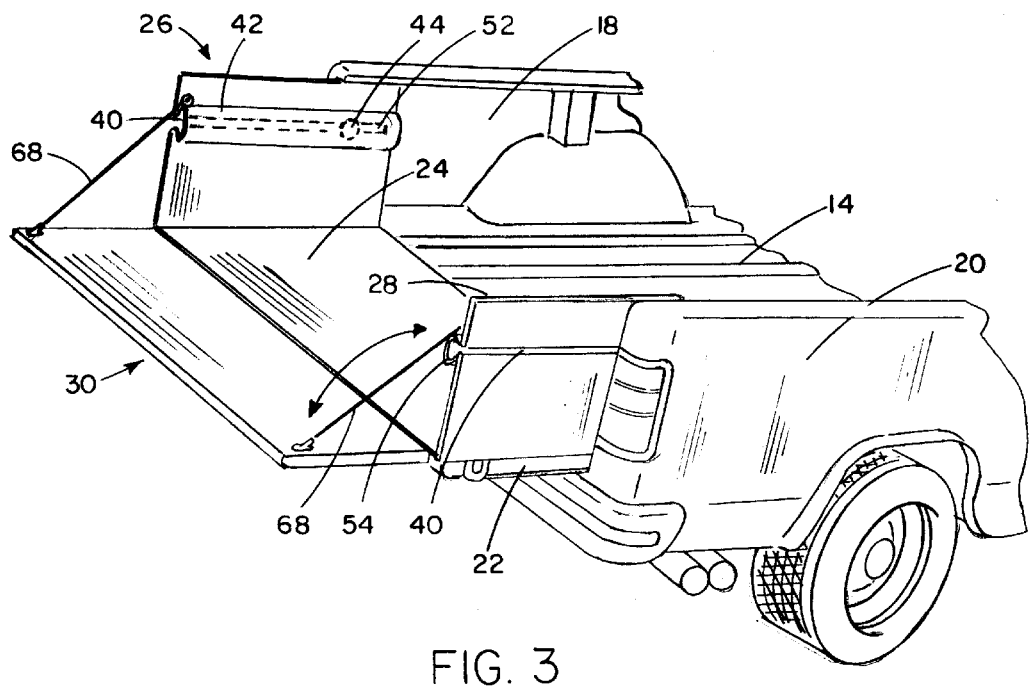
FIG. 3 is a perspective view of the rear portion of the pickup truck with an extension bed showing the channels in the extension side walls and showing a see-through view of one side of the pin extending into the channel and connecting the side wall to the pickup truck side walls.
Figure 4:
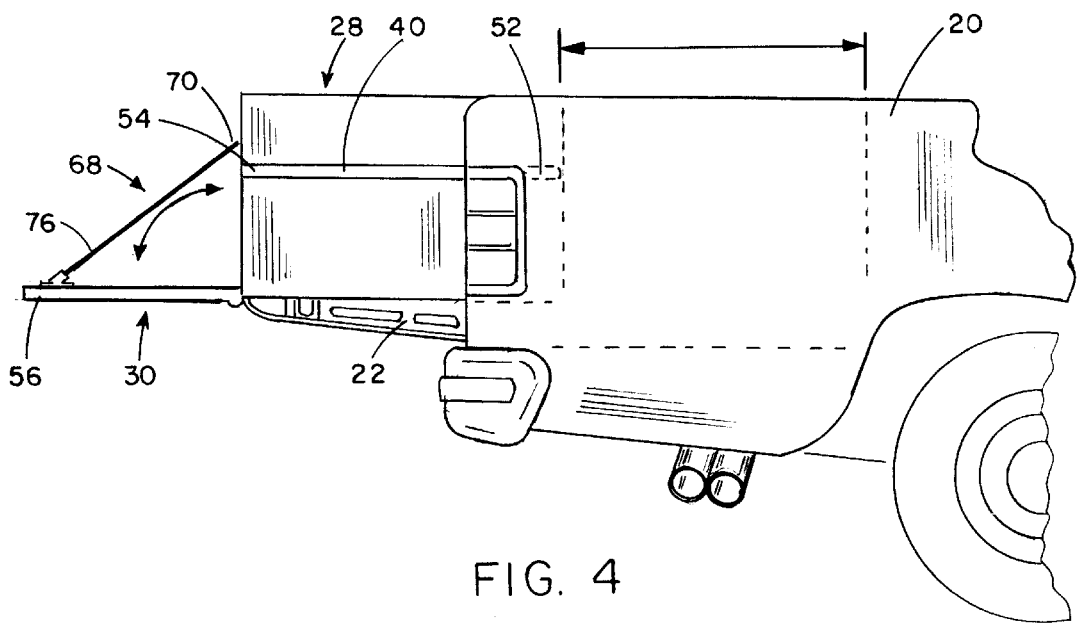
FIG. 4 is a side view of the extension bed in the extended position and channel in the side wall and showing in broken lines the position of the extension side wall in the retracted position.
Figure 5:
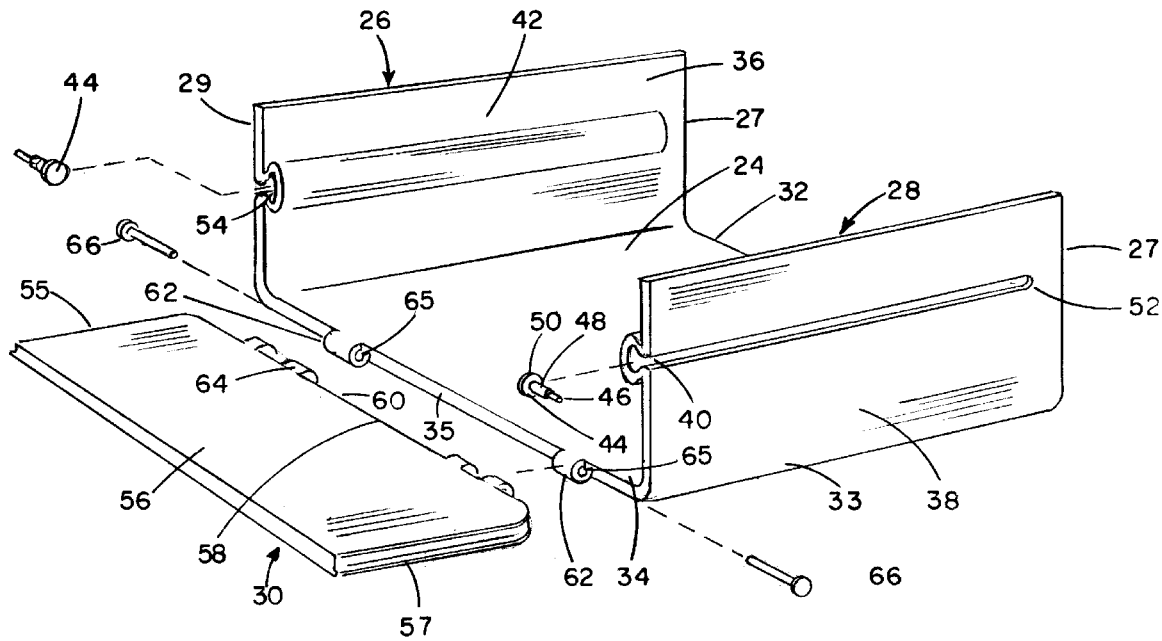
FIG. 5 is a perspective partially exploded view of the extension bed showing the loop and post attachment means for attaching the extension tailgate to the extension floor and showing the t-shaped channels and pins to be inserted in the channels.
Figure 6:
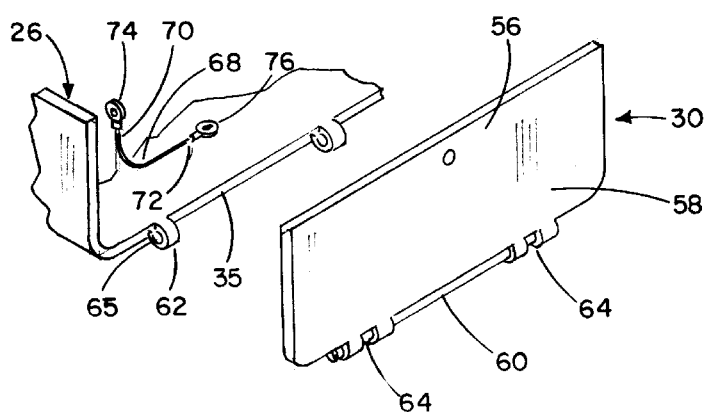
FIG. 6 is a perspective partially exploded view of the flexible members of the support mechanism for the extension tailgate in the folded, storage position.

In the preferred embodiment, the extension side walls 26, 28 include substantially t-shaped channels 40, in the exterior surface 38 which form a raised portion 42 on the interior surface 36 of each side wall 26, 28. As shown in FIGS. 2–5, the t-shaped channels are substantially horizontally disposed near the middle portion of the side walls 26, 28 and extend from the front end 27 to the back end 29 of each side wall 26, 28. As best seen in FIGS. 3 and 5, the subject invention includes a pair of knobs or pins 44, which are adapted to be slidably received and held within each t-shaped channel 40. In the preferred embodiment, each pin 44 has a base 46, a neck 48, and an enlarged head 50. The neck 48 and head 50 are specifically dimensioned to be inserted into and slidable through the t-shaped channels 40. Prior to installing the extension bed 10 in the truck bed the base 46 of the pins 44 is securely fastened to the opposing interior side walls 18, 20 of the truck for mounting the pins on the truck side walls, and thereafter slidably connecting the extension side walls 26, 28 to the truck side walls 18, 20 so that the extension bed 10 is slidable along the length of the t-shaped channels 40. Preferably, the base 46 of the pins 44 is securely fastened by an internally threaded nut screwed on corresponding threaded portions of pins 44. While the pins are shown secured to the truck side walls by a threaded nut, it will be understood that any suitable method for securing the pins 44 to the truck side walls, such as metal screws, welding, or the like, may be used in the subject invention.

Each t-shaped channel includes a closed end 52 near the front end 27 of the sidewalls 26, 28 for providing a stop which prevents the pins 44 from exiting the channels 26, 28 at the front end 27 of the side walls and disengaging from the side walls 26, 28. It is a feature of the subject invention that the improved truck cargo space extension bed increases the security and strength of the extension bed by preventing the bed 10 from extending to a length beyond the open tailgate 22 of the truck. Each t-shaped channel 40 also includes an open end 54 opposite from the closed end 52 of the channel for receiving the neck 48 and enlarged head 50 of the pins 44 at the back end 29 of the side wall for slidably mounting the side walls 26, 28 to the truck side walls and installing the extension bed in the truck bed.

In the preferred embodiment of the subject invention, the extension tailgate 30 is rotatable between a closed, upright position against the back end 29 of the side walls 26, 28 and an open, horizontal position level with the extension floor 24 (see FIGS. 1–4). The extension tailgate 30 includes opposite sides 55, 57, a top end 56, and a bottom end 58 having a bottom edge 60. The rear end 34 of the extension floor 24 includes a rear edge 35 and the bottom edge 60 of the tailgate 30 is positioned adjacent to the rear edge 35 of the extension floor and the tailgate 30 is attached to the floor 24 by an attachment means. In the preferred embodiment, the attachment means is two sets of corresponding loops or tubes 62, 64 extending from the rear edge 35 and bottom edge 60 and includes a post or bolt 66 extending through each set of loops for attaching the tailgate 30 to the extension floor 24 and for defining a horizontal axis around which the extension tailgate 30 rotates from a closed to an open position. As shown in FIG. 5, the rear edge 35 of the floor includes floor tubes 62, and the bottom edge 60 of the tailgate 30 includes tailgate tubes 64, and each tube 62, 64, includes a cylindrical through hole 65.

The tailgate 30 is rotatably secured to the floor 24 by positioning the floor tubes 62 adjacent to the tailgate tubes 64, such that the cylindrical through holes 65 are in alignment with each other and a bolt 66 is inserted through the floor tube 62 and tailgate tube 64 and another bolt 66 is inserted through the other floor tube 62 and tailgate tube 64.

In addition, the subject invention includes a support mechanism for supporting the extension tailgate 30 in the open horizontal position. In the preferred embodiment, the support mechanism includes a pair of flexible members 68 having opposite ends 70, 72. Each flexible member 68 is attached at one end 70 to the upper portion 31 near the back end 29 of each side wall 26, 28 and the opposite end 72 is attached near the top end 56 to each side 55, 57 of the tailgate 30. Preferably, the flexible member 68 is attached to the side walls 26, 28 and tailgate 30 utilizing two pairs of hooks 74, 76 such that one hook of each pair is securely fastened to the upper portion 31 near the back end 29 of each extension side wall 26, 28 and the other hook 76 of each pair is securely fastened near the top end 56 of each side 55, 57 of the tailgate 30. As shown in FIGS. 1–4, each flexible member 68 extends from each side wall 26, 28 to the tailgate 30 to a predetermined length which supports the tailgate 30 in the open, horizontal position. When the tailgate is in the closed, upright position, the flexible members 68 fold into a collapsed, storage position (see FIG. 6). In the preferred embodiment, the flexible members 68 are metal chains. However, it will be understood that the flexible members 68 may be constructed of any strong, resilient material such as nylon which is collapsible into a folded, storage position yet reliably secures the tailgate when in the open horizontal position.

While specific embodiments and features of the invention have been disclosed herein, it will be readily understood that the invention encompasses all enhancements and modifications within the scope and spirit of the following claims.

We claim:

1. An extension bed for extending a cargo space of a truck of a type having a truck bed including a floor, side walls, and a tailgate, said extension bed being adapted to be positioned within the truck bed and comprising:

(a) an extension floor having a forward end and a rear end and a pair of opposing, upright extension side walls attached to said extension floor, each extension side wall having a front end adjacent to the forward end of the extension floor and a back end adjacent to the rear end;

(b) a substantially t-shaped channel in each extension side wall having a length extending from the front end to the back end of the extension side wall thereof for slidably connecting the extension side walls to the side walls of the truck bed, said t-shaped channels being substantially horizontally disposed in the extension side walls; and (c) a pair of pins each adapted to be slidably received and held within a respective said t-shaped channel, said pins being securely fastened to the truck side walls of the truck bed for slidably mounting the extension side walls to the truck side walls;

(d) wherein said extension side walls slidably engage said pins along the length of the t-shaped channels whereby said extension bed is slidable from a retracted position within the truck bed to an extended position supported by the tailgate of the truck bed when open.

2. The extension bed of claim 1, wherein each pin has a base, a neck, and an enlarged head, said neck and said head of each pin being adapted to be inserted into the respective t-shaped channel and slidable therethrough, and said bases are securely fastened to the side walls, respectively, of the truck bed.

3. The extension bed of claim 2, wherein each t-shaped channel has opposite ends including a closed end at the front end of the extension side wall thereof and an open end at the back end of the extension side wall thereof, said closed ends defining stops for preventing said pins from exiting said channels at the front ends of the extension side walls and disengaging from the extension side walls, and said open ends receiving said pins into said t-shaped channels at the back ends of the extension side walls for slidably mounting the extension side walls of the extension bed to the truck bed.

4. The extension bed of claim 3, wherein each t-shaped channel is formed in an exterior of the extension side wall thereof facing a respective one of the truck side walls whereby the pins secured in the truck side walls are receivable in and slidable along the length of said t-shaped channels.

5. The extension bed of claim 3, further including an extension tailgate attached to the extension floor, said extension tailgate being moveable between a closed, upright position against the back ends of the extension side walls and an open, horizontal position level with the extension floor.

6. The extension bed of claim 5, wherein said extension tailgate includes an attachment means for rotatably attaching the extension tailgate to the rear end of the extension floor.

7. The extension bed of claim 6, wherein said extension tailgate further includes a top end and a bottom end, said bottom end having a bottom edge and said rear end of the extension floor including a rear edge, wherein said bottom edge of the extension tailgate is positioned adjacent to the rear edge of the extension floor and said attachment means is positioned therein for connecting the extension tailgate to the extension floor.

8. The extension bed of claim 7, wherein said attachment means comprises a set of corresponding loops extending from the rear edge and the bottom edge and a post extending through the loops for attaching the extension tailgate to the extension floor and defining a horizontal axis for rotating the extension tailgate from the closed, upright position to the open, horizontal position.

9. The extension bed of claim 7, wherein said attachment means comprises a pair of tubes extending from the rear edge of the extension floor and a pair of tubes extending from the bottom edge of the extension tailgate, said tubes each having a cylindrical through hole, said tailgate tubes being positioned adjacent to the floor tubes when the bottom edge of the extension tailgate is positioned adjacent to the rear edge of the floor, wherein the cylindrical through holes of all of the tubes are in alignment for receiving a pair of bolts for rotatably securing the extension tailgate to the extension floor.

10. The extension bed of claim 7, further comprising a support mechanism attached to said extension side walls and to the extension tailgate for supporting said extension tailgate in the open, horizontal position.

11. The extension bed of claim 10, wherein said extension side walls have upper portions and said extension tailgate has opposite sides, said support mechanism including a pair of flexible members having opposite ends, wherein one said end of each flexible member is attached to the upper portion near the back end of a respective said extension side wall and another said end of each flexible member is attached to a respective said side of the extension tailgate near the top end of the extension tailgate.

12. The extension bed of claim 11, wherein each flexible member extends from the respective extension side wall to the respective side of the extension tailgate to a predetermined length for supporting the extension tailgate in the open, horizontal position and folds into a collapsed, storage position when the extension tailgate is in the closed, upright position.

13. The extension bed of claim 12, wherein said support mechanism further includes two pairs of hooks, wherein one hook of each pair of hooks is securely fastened to the upper portion near the back end of the respective extension side wall and another hook of each pair of hooks is securely fastened near the top end at the respective side of the extension tailgate for connecting the flexible members to the extension side walls and the extension tailgate.

14. The extension bed of claim 13, wherein each flexible member is a metal chain.

15. The extension bed of claim 12, wherein said support mechanism further includes a means at each end of said support mechanism for attaching said support mechanism to the upper portions near the back ends of the extension side walls and near the top end at the sides of the extension tailgate for connecting the flexible members to the extension side walls and the extension tailgate.

* * * * *